2 Sheets—Sheet 1

H. SALOSHINSKY,

Assignor to McKay & Bigelow Heeling-Machine Association, J. W. Brooks, Trustee.

Machine for Attaching and Finishing Boot-Heels.

No. 8,923. Reissued Oct. 7, 1879.

Witnesses.
L. F. Connor
N. E. Whitney

Jas. W. Brooks, Trustee of McKay & Bigelow Heeling Machine Association, Apee by mesne assignments of the Inventor,
Herman Saloshinsky,
by Dorsey & Gregory Attys.

2 Sheets—Sheet 2.

H. SALOSHINSKY,

Assignor to McKay & Bigelow Heeling-Machine Association, J. W. Brooks, Trustee.

Machine for Attaching and Finishing Boot-Heels.

No. 8,923. Reissued Oct. 7, 1879.

Witnesses
L. F. O'Connor.
N. E. Whitney

Jas. W. Brooks, Trustee of McKay & Bigelow Heeling Machine Association, acting by mesne assignments of the Inventor,
Herman Saloshinsky,
by Crosby & Gregory Attys

UNITED STATES PATENT OFFICE.

JAMES W. BROOKS, OF CAMBRIDGE, MASSACHUSETTS, TRUSTEE OF THE McKAY & BIGELOW HEELING MACHINE ASSOCIATION, ASSIGNEE, BY MESNE ASSIGNMENTS, OF HERMAN SALOSHINSKY.

IMPROVEMENT IN MACHINES FOR ATTACHING AND FINISHING BOOT-HEELS.

Specification forming part of Letters Patent No. 27,008, dated January 31, 1860; Reissue No. 2,531, dated March 26, 1867; extended January 30, 1874; Reissue No. 8,923, dated October 7, 1879; application filed August 11, 1879.

*To all whom it may concern:*

Be it known that HERMAN SALOSHINSKY, of Boston, in the county of Suffolk, in the State of Massachusetts, invented an Improved Machine for Attaching Heels to Boots and Shoes and for finishing the same, of which the following is a full, clear, and exact description, reference being had to the accompanying drawings, making part of this specification, in which—

Figure 1:
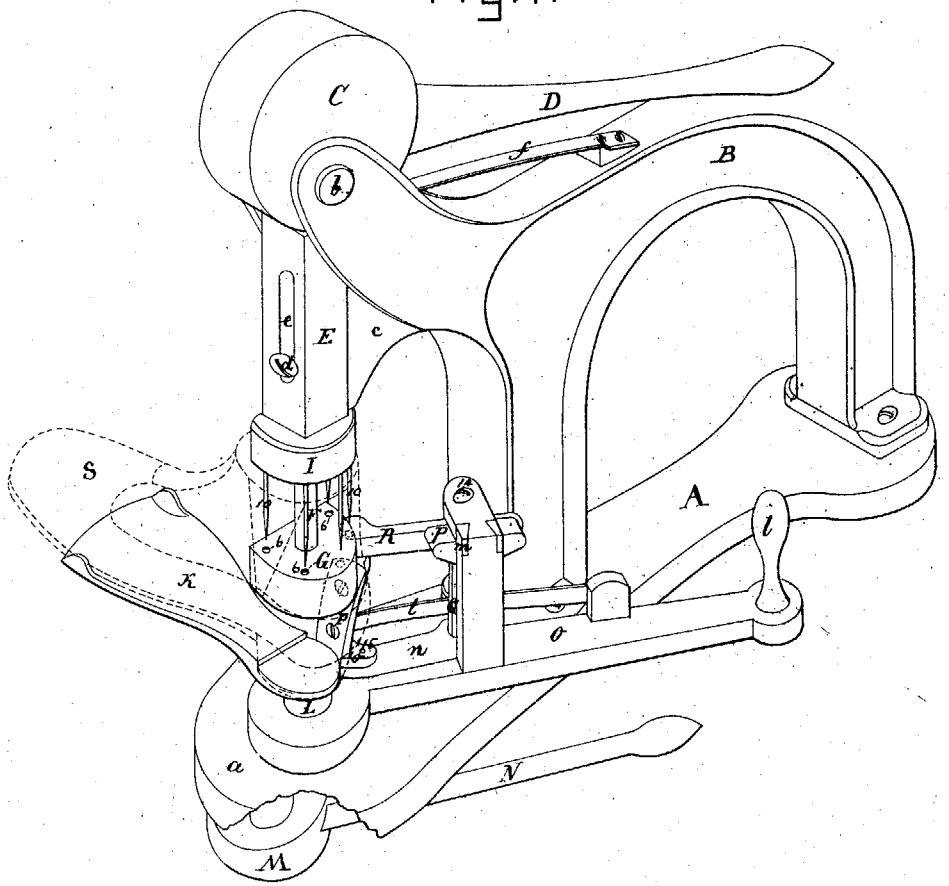
Figure 4:
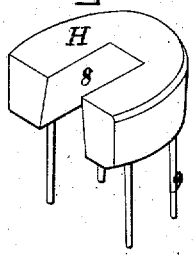
Figure 2:
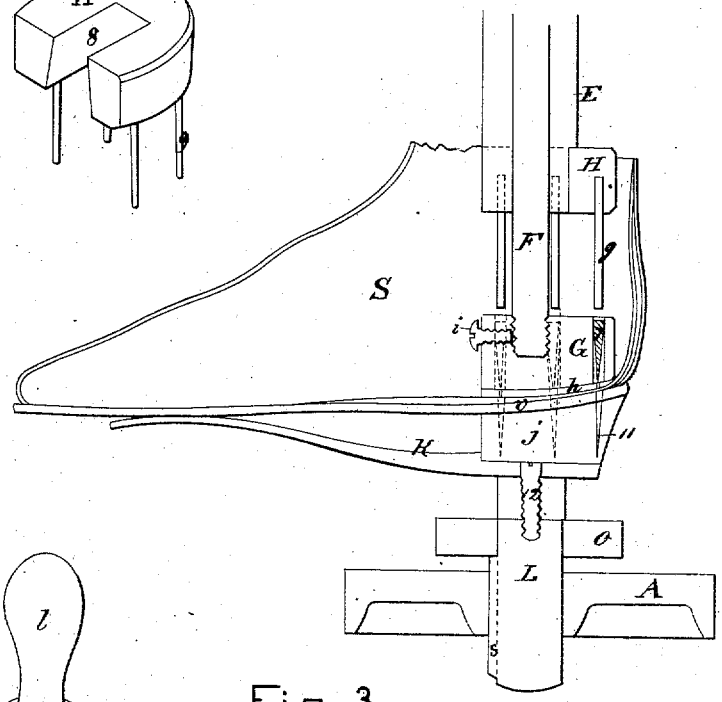
Figure 3:
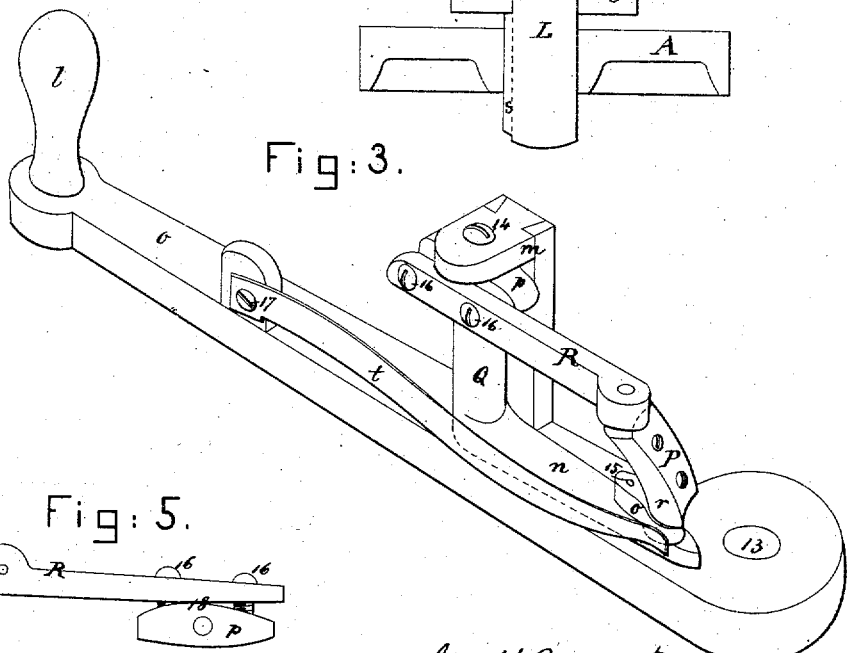
Figure 5:
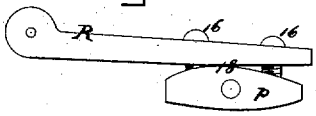

Figure 1 is a perspective view of the machine. Fig. 2 is a section taken through a boot or shoe and a part of the machine, showing the boot or shoe and parts of the machine in position in readiness for the nails to be driven into the heel. Fig. 3 is a perspective view of the apparatus for trimming the heel, detached from the rest of the machine. Figs. 4 and 5 details to be referred to hereinafter.

The objects of this invention are to facilitate and cheapen the fastening of heels to boots and shoes, and the forming of the curvilinear outline of the heels when fastened to boots or shoes.

And said invention consists, first, in such an organization and arrangement of parts as will operate together to drive simultaneously several nails from the inside of a boot or shoe through the sole thereof into the heel, for the purpose of uniting the heel to the boot or shoe effectively, expeditiously, and with great neatness; second, in such an organization and arrangement of parts as to combine in one machine means for nailing or pegging a heel to the sole of a boot or shoe, and means which form the curvilinear outline of the heel, by causing the heel to turn with reference to the knife, or the knife with reference to the heel.

In the said drawings, A is the bed of the machine, which is secured to a suitable bench or table so that the end *a* projects over the edge of it.

From this bed rises the frame B, to which is pivoted at *b* an eccentric-cam, C, operated by a lever, D, this cam serving, when thrown over by the lever D, to depress a bar, E, which slides up and down on ways on the front part, *c*, of the frame B, to which it is secured by a screw, *d*, and slot *e*.

A spring, *f*, attached to the top of the frame B, serves to raise the bar E.

A rod, F, is attached to the part *c* of the frame B, the screw *d* passing through it, and the bar E embracing and sliding over it.

To the lower end of this rod F is attached a nail-receiving block, G, which is screwed onto the end of the rod, and is prevented from turning by a small screw, *i*, passing through it, as shown in Fig. 2.

This block G is of a form and size corresponding with the heel of the boot to be operated on, and has in it a series of holes, 6, made vertically through it to receive the nails 7, Fig. 2, which are to be driven through the sole of the boot into the heel.

The block G is turned or shaped to correspond with the shape of the end of the heel, and the holes 6 made through it vertically near its periphery accord in shape with a heel-lift, so as to hold the series of nails in such position with relation to the heel as to be driven into it at uniform distances from its edge.

As the sizes of the boots vary, this block G may be changed.

A piece of sheet-rubber, *h*, secured to the lower side of the nail-receiving block G, acts as a holder to sustain the nails by their points until they are to be driven to unite the heel and shoe.

The holes in *h* close sufficiently to prevent the nails 7 from dropping out, but open or yield to let them be forced through at the proper time, as required.

The lower end of the bar E is cut away, and its sides are dovetailed to correspond with a mortise, 8, in a block, H, Fig. 2, and shown detached in Fig. 4, which is slipped on from one side of the bar, and is prevented from falling by the dovetailed tenon. This block has projecting from its lower side a series of pins, 9, corresponding in number and position with the holes 6 in the nail-receiving block G. Another block, I, Fig. 1, of the same form as the block H, also fits the tenon on the end of the bar E, and is intended to be used alternately with the block H, it carrying a series of long pins or awls, 10, intended to punch holes through the sole and heel for the reception of the nails 7, as shown in the heel J at 11, Fig. 2.

A rest, K, for the support of the boot is attached at 12 to the top of a shaft, L, which passes up through the bed A, and is raised as required, to compress the heel of the boot between the rest and block G, and to hold the heel firmly against the sole while being operated upon and being nailed.

The compressing device (shown as a cam, M,) is pivoted to the front of the bed A, alongside of the shaft L, and is turned by a long lever, N. This cam, acting against the lower end of the shaft L as the cam is turned, raises the shaft and the rest K, firmly and very powerfully compressing and clamping the heel and sole together.

A spline, S, Fig. 2, on the shaft L prevents its turning around. The trimming-knife-operating lever O (shown detached in Fig. 3) is pivoted at 13 on the shaft L, and is free to be swung around horizontally by a handle, *l*, at the outer end of it. This lever carries the knife P, for trimming and shaping the heel.

The position or inclination of this knife is adjusted in the following manner to give the required inclination or bevel to the edge of the heel: A vertical post, Q, is pivoted to the top of the lever O, and at 14 to a stud, *m*, rising therefrom. An arm, *n*, projects horizontally from the post Q, and carries at its outer end a block, *o*, which is pivoted at 15 to the arm *n*. On the upper part of the post Q is a block, *p*, the face 18 of which is rounded off, as shown in Fig. 5, so that a horizontal arm, R, which is attached to it by screws 16, may rock over the rounded face of the block *p* as the said arm is adjusted by tightening one and loosening the other of the screws. This alters the position of the arm R with respect to the arm *n*. A block, *r*, which has attached to its face the knife P, is pivoted in the block *o* and in the end of the arm R. As the relative positions of the arms *n* and R are changed, the inclination of the block *r* will be varied to give the required slope or bevel to the heel J. A spring, *t*, secured at 17 to the lever O, presses the arm *n* and the knife P in toward the heel. The lever O and parts connected therewith are raised with the shaft L and rest K.

The following is the operation of the machine. The boot S (shown in dotted lines Fig. 1, and in section Fig. 2) is placed upon the rest K, with the heel J in its place. The lever N is turned, when the cam M raises the shaft L and rest K and compresses the heel J against the bottom of the sole of the boot, and the inside of the sole against the block G. The under side of the block G is rounded to give the proper form to or conform to the inside of the heel of the boot.

A block, G, of the proper form and size having been secured to the rod F, and the block I being in place, as shown in Fig. 1, the lever D is thrown over, and the eccentric C depresses the bar E and drives the awls 10 down through the holes 6, through the sole *v* of the boot, and into the heel J, penetrating nearly through the heel, making the holes 11. The lever D is then thrown back, when the spring *f* lifts the bar E and draws out the awls 10. The block I is now removed, and the block H, Fig. 4, is slipped onto the end of the bar E in place of it. The nails 7 are dropped into the hole 6 in the block G. The lever D is again thrown over, when the pins 9 drive all the nails down into the heel at one operation. While the boot is still securely held in place the lever O is swung round horizontally, and the knife P, which is pressed against the heel by the spring *t*, trims off and shapes the heel as required.

The above machine nails on the heel of a boot or shoe and finishes it off, completing the operation at one time in the same machine without the loss of time which would result from having to change the boot from one machine to another.

I claim—

1. A heel-nailing machine organized substantially as specified to drive or force several nails or pegs simultaneously from the inside of a boot or shoe through its sole into the heel thereof, substantially as described.

2. The combination in one machine of means substantially as specified for nailing or pegging the heel of a boot or shoe to the sole thereof, and means substantially as specified for forming the curvilinear outline of the heel by causing a relative turning movement between the heel and a cutting-edge, substantially as described.

3. The nail-guiding block provided with the series of holes 6, arranged to receive the nails, and an attached holder to act upon the points of the said nails and retain them in the box until it is desired to drive them, combined with a series of drivers to descend into and drive the nails from the said holes into and so as to secure the heel to the sole, substantially as described.

4. In a heel-nailing machine, a block to receive and guide a series of nails, a series of drivers to simultaneously drive the nails therefrom, a rest or support for the heel and shoe, and a compressing device, whereby the heel and sole are clamped closely and firmly together between the shoe-rest and nail-guiding block preparatory to driving the nails to fasten the heel to the sole, substantially as described.

5. A nail-guiding block, mechanism for driving nails, and a support or rest to hold between itself and the nail-guiding block the sole and heel, combined with a heel-trimming knife and with mechanism to operate the same to form the curvilinear outline of the heel, substantially as described.

6. In a heel-nailing machine, a perforated nail-plate, mechanism for driving nails, an opposed holder for the shoe at its heel end, and a compressing device adapted to force together the plate and holder and firmly compact the material held between them, and so hold it while it is being united, substantially as described.

JAMES W. BROOKS,
*Trustee of the McKay & Bigelow Heeling Machine Association.*

Witnesses:
N. E. WHITNEY,
G. W. GREGORY.